United States Patent [19]

Monnet

[11] 4,029,454

[45] June 14, 1977

[54] INJECTION MOLDING MACHINE FOR COMPOSITE ARTICLES

[76] Inventor: Bernard Léon Monnet, "Mont Olivet", Bellignat, Ain, France

[22] Filed: Sept. 23, 1974

[21] Appl. No.: 508,568

[30] Foreign Application Priority Data

Sept. 25, 1973 France .............................. 73.34327

[52] U.S. Cl. .......................... 425/130; 425/245 R; 425/247; 425/812
[51] Int. Cl.² .......................................... B29F 1/10
[58] Field of Search ............. 425/4, 130, 243, 244, 425/247, 817, 812, 245; 264/46.4, 46.6, DIG. 83, 328

[56] References Cited

UNITED STATES PATENTS

| 2,191,703 | 2/1940 | Anderson | 425/117 |
|---|---|---|---|
| 2,995,778 | 8/1961 | Hill | 425/812 |
| 3,163,687 | 12/1964 | Einhorn | 425/812 |
| 3,599,290 | 8/1971 | Garner | 425/817 R |
| 3,661,487 | 5/1972 | Susin | 425/243 |
| 3,669,598 | 6/1972 | Tucker | 264/328 |
| 3,690,797 | 9/1972 | Garner | 425/130 |
| 3,793,415 | 2/1974 | Smith | 425/817 R |
| 3,888,612 | 6/1975 | Schrewe et al. | 425/130 |
| 3,891,362 | 6/1975 | De Vita | 425/4 R |

FOREIGN PATENTS OR APPLICATIONS

| 1,290,262 | 3/1962 | France | 425/130 |
|---|---|---|---|
| 2,115,487 | 7/1972 | France | |
| 1,281,723 | 7/1972 | United Kingdom | |

OTHER PUBLICATIONS

Garner, Def. Pub. Search Copy of Ser. No. 202,459, filed Nov. 26, 1971, Published in 869 O.G. 687, on Nov. 7, 1972 Def. Pub. T904,007.

Primary Examiner—Francis S. Husar
Assistant Examiner—John McQuade
Attorney, Agent, or Firm—Finnegan, Henderson, Farabow & Garrett

[57] ABSTRACT

The present invention is concerned with a machine for the production by injection welding of articles of large size and/or complex structures having, at least locally, composite portions formed by the introduction of one of at least two materials of different compositions inside the other, the apparatus including a mould having fixed and movable portions, at least two separate systems for supplying materials to be injected into the said mould, and at least two distribution valves for these materials, one of the valves being of the multi-way type so as to cause a common discharge channel for material into the mould to communicate with either or both of the separate material-supply systems.

10 Claims, 9 Drawing Figures

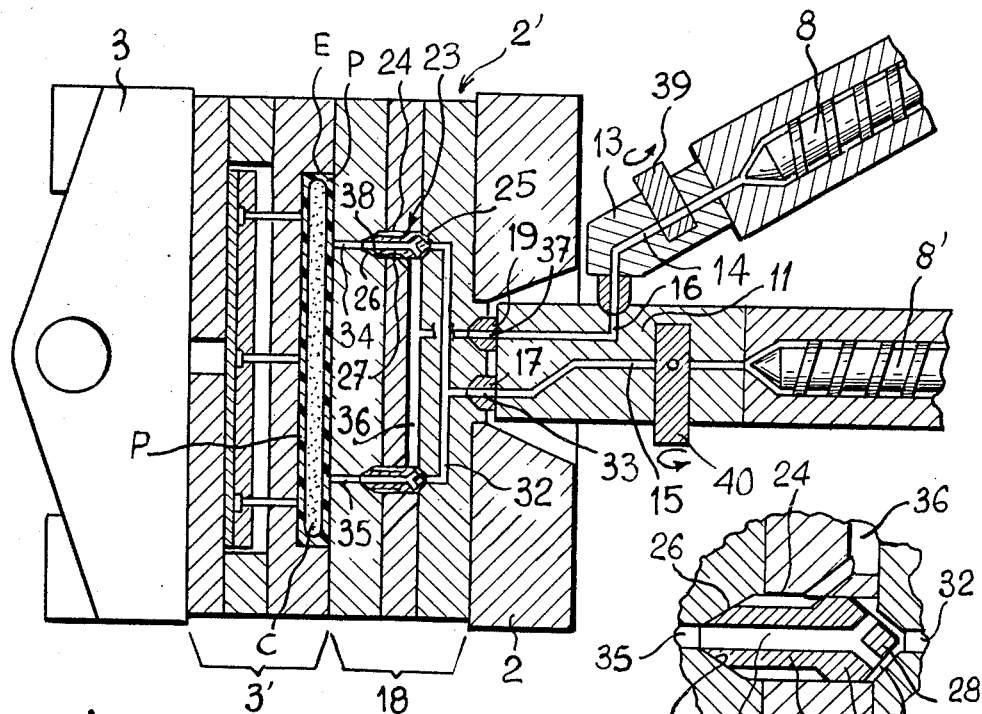
Fig.2
Fig.2a
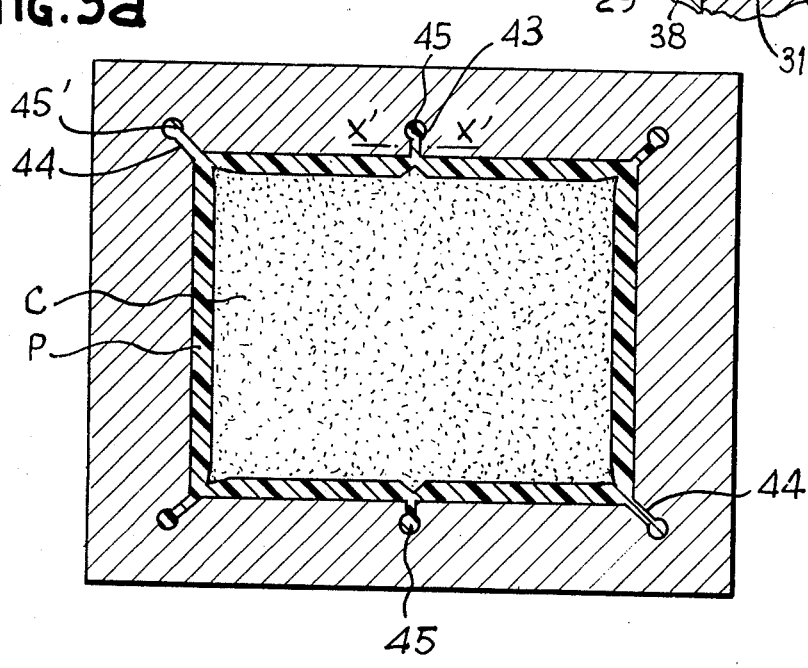
Fig.3a

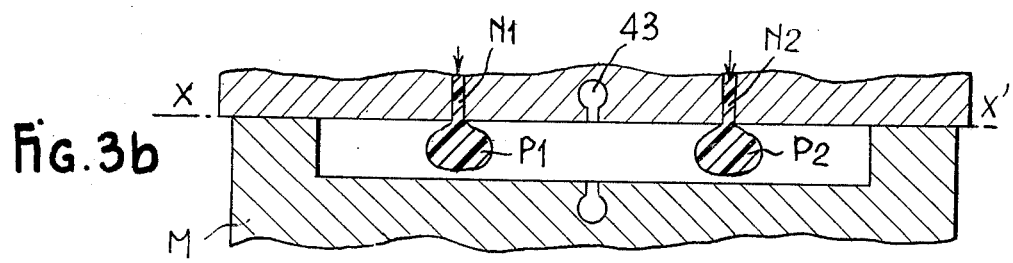
Fig.3b
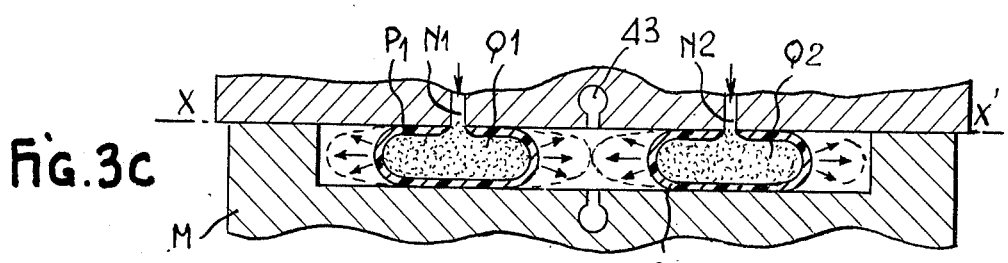
Fig.3c
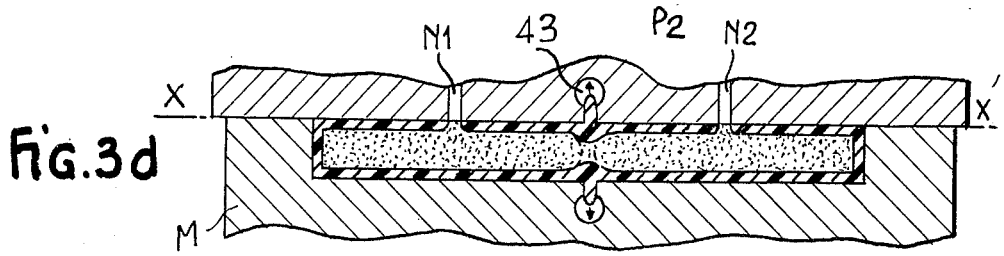
Fig.3d
Fig.4
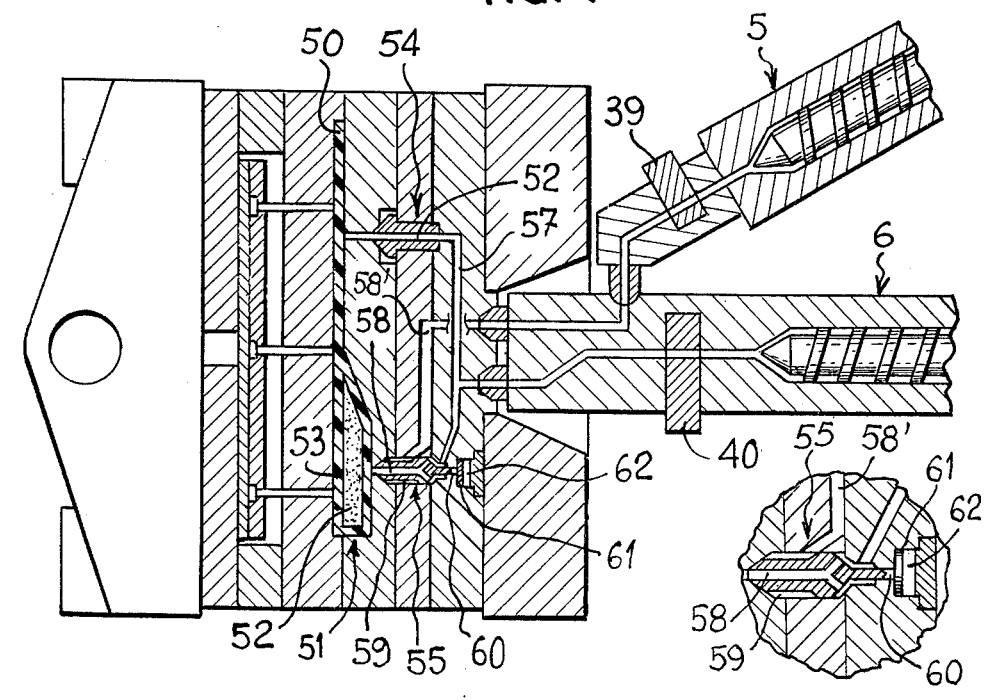
Fig. 4a

INJECTION MOLDING MACHINE FOR COMPOSITE ARTICLES

The present invention relates to the injection moulding of articles of large size and/or of complex structure, having at least locally composite portions formed by the arrangement one inside the other of at least two materials of different compositions.

Injection moulding techniques are already known, following which, in order to produce in the most simple case, an article constituted entirely by two materials, of which one forms a skin covering the second, by employing a single distributor valve having at least two passages for material put alternately into communication with one or the other of two separate supply systems for delivering material to the injection mould, this technique consisting of injecting a first material into the mould and then injecting the second material into the interior of the first so that the second material pushes back the first material against the walls of the mould.

This known technique is suitable for the production of articles of small size and simple structure such as for example panels, but up to the present time difficulties of utilization were encountered for articles of considerable widths and lengths, and especially for articles having a complex structure.

In fact, with a single distributor valve,

1. It is not possible in practice to obtain a homogeneous distribution of the second material injected inside the skin which must enclose it when articles of large size are manufactured. This is explained by the fact that the material is injected at a central point far from the extremities of the mould, and that the second material does not reach quickly enough the end zones of the mould to avoid premature solidification of the first material, which thus opposes any displacement of the internal material. There is thus a risk of obtaining badly-shaped articles in which the materials will be badly distributed, over-thicknesses of the material forming the skin appearing at the periphery of the articles together with an undesirable thinning-down at the level of the injection zone.
2. It is impossible to produce articles in which certain zones will be constituted over their whole thickness by a single material while certain others have a mass of material coated by a skin.
3. It is difficult to manufacture articles of complicated shapes, comprising hollowed zones circumscribed by a continuous surrounding portion.

The present invention proposed apparatus which develops the technique referred to above in such manner that it can be applied to the manufacture of articles of complex structure and/or large dimensions, and having at least locally, composite parts in which are formed two materials of different compositions, of which one is enclosed by the other.

According to the present invention, a first material is injected at several pre-determoned zones of the mould, and then there is injected into the first material in the zones of the mould corresponding to the composite parts of the article, a second material which penetrates into the first and pushes it back against the walls of the mould, this said second material thus becoming coated with the first.

However, in the case where a first and then a second material are injected successively into two adjacent zones, it was observed that it was difficult to arrange mattters so that the two charges of second material became welded together since a sheet of the first material remained between them.

This constituted a disadvantage in the case where it was desired to obtain an article in which the core formed by the second material constitutes a homogeneous mass. According to another aspect of the method of the invention, this difficulty was resolved by providing, substantially in the junction plane of the masses of first material injected, a leakage of a pre-determined quantity of the first material from the space of the useful cavity of the mould, so as to enable the masses of the second material to push back the first material which separates them, and in consequence to become joined and mixed together at the level of this junction plane.

According to still a further aspect of the invention, the present invention is characterized by the fact that, in the zones of the mould in which the composite parts of the article are formed, the mould is fed through multi-way distributor valves. On the contrary, in the zones of the mould in which the single parts of the article are formed, distributor valves having only a single material passage are employed.

The present invention particularly relates to an injection-moulding machine comprising a mould and at least two separate supply systems for material to be injected in the mould, and being characterized in that it is equipped with at least two material-distribution valves, one of these values being a multi-way valve which is coupled to each of the supply systems, this valve causing a channel for discharging material into the mould to communicate selectively with one or the other of the supply systems.

The multi-way valve employed will advantageously be of the type described in French Pat. No. 1,290,262 of March 1st 1961, namely having two coaxial material passages or having more than two passages if so desired.

The number and the nature of the valves will naturally change in dependence on the article which it is intended to produce. Thus, if the article is to be wholly constituted of a core of one or several given materials surrounded by a continuous skin of another material, all the valves employed will be multi-way valves.

On the contrary, if the article has composite portions (that is to say with a core and a skin) and single portions (constituted by one single material), the zone of the mould in which the single parts are to be formed will be fed from a distributor valve with a single pressure causing a discharge channel for material in the mould to communicate with one single supply system.

In the case in which only multi-way valves are available, each supply system is coupled by a channel common to all the distributor valves. On the contrary, if multi-way valves and valves with a single passage are available, only the supply system delivering the material which is to form the skin is coupled to the whole valve assembly, the other supply system being connected solely to the multi-way valves.

Finally it will be noted that the types of materials utilized may be of any kind. Thus, it would be possible to utilize materials of the same structure but with different characteristics, or a combination of materials comprising foaming agents or not, especially for the production of the core.

There will now be described by way of non-limitative examples, several forms of construction of a machine according to the invention, reference being made to the accompanying drawings, in which:

FIG. 2 is a diagrammatic detail to a larger scale, showing the arrangement of the injection head comprising solely multi-way distributor valves;

FIG. 2a is an enlarged fragmentary cross-sectional view of one of the valves illustrated in FIG. 2;

FIG. 3a is a plan view of the moving portion of the mould employed with the machine shown in FIG. 2;

FIGS. 3b, 3c and 3d are diagrams illustrating the way in which the materials are distributed in the mould;

FIG. 4 is a detail similar to that of FIG. 2, but in which the injection head comprises a multi-way valve and a single-way valve;

FIG. 4a is a fragmentary cross-sectional view illustrating the lowermost valve shown in FIG. 4.

FIG. 1 represents an injection assembly, the general structure of which is conventional and which will therefore not be described in detail.

Figure 1:
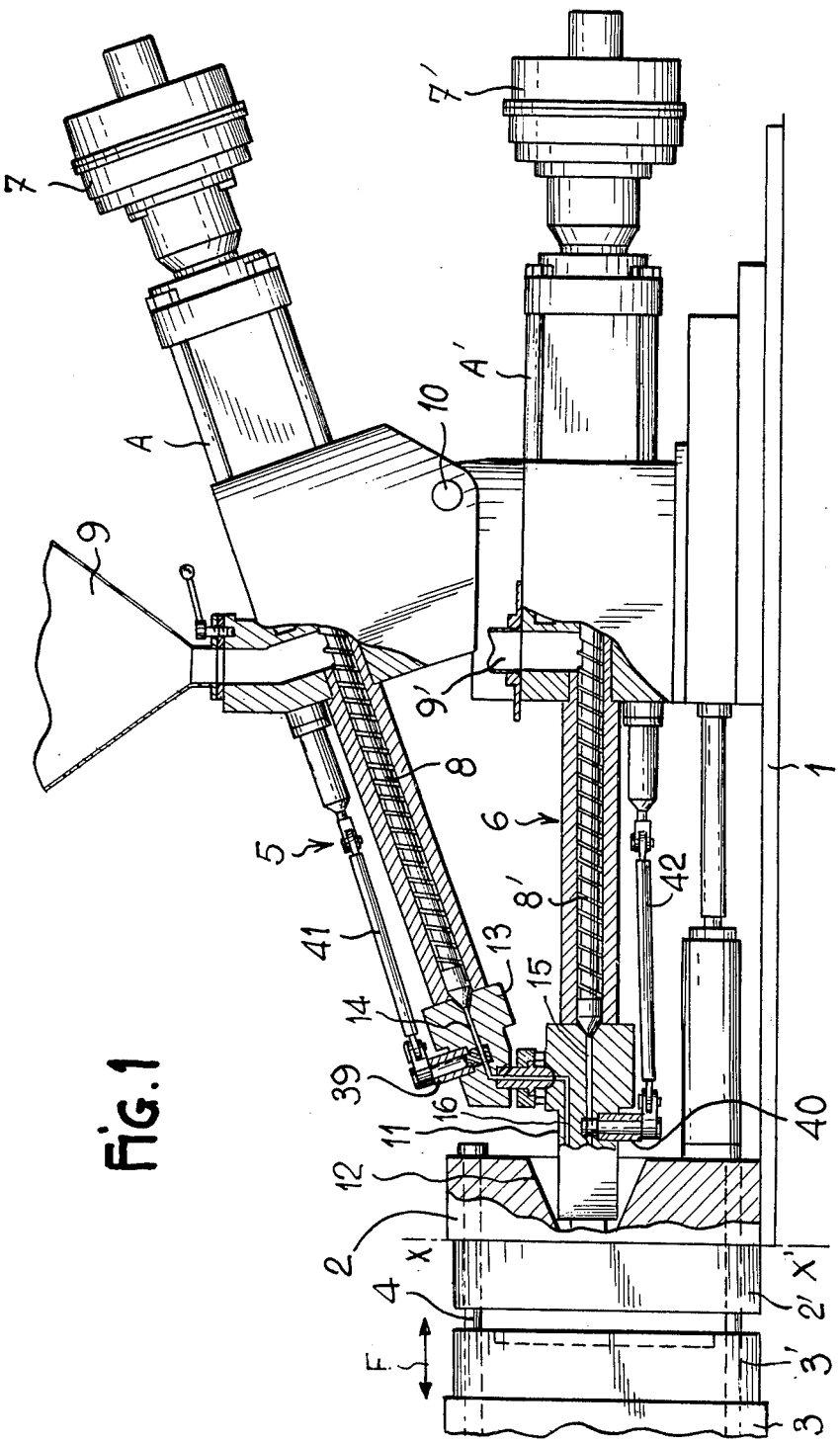
FIG. 1 is a diagrammatic general view of a injection assembly according to the invention.

On a frame 1 is mounted the fixed plate 2 supporting a mould 2' and also the moving plate 3 carrying the other part 3' of the mould, capable of moving alternately in the direction of the arrow F on guiding pillars which are fixed, one pillar only being shown at 4. The press shown being intended to produce parts composed of two materials, it comprises two separate feed systems for the mould, indicated respectively at 5 and 6.

Again in a conventional manner, the supply systems are respectively constituted by a body in which is mounted rotatably under the action of a motor 7—7', a plastification screw 8—8' which is fed with raw material from a hopper 9—9' and which introduces the material into the mould in the molten form by the action of hydraulic jacks A—A'. It will be noted that in the example shown, the screws 8 and 8' are superimposed and their bodies are mounted one on the other through an articulation axis 10. This constitutes an arrangement which is preferred but not essential.

There will now be described more precisely the injection nose of the press. At the end of the distributor system 6 is mounted a member 11 passing into an orifice 12 of the fixed plate of the mould and to which is also coupled the nose of the distributor system 5 by a fixing part 13 pierced with a channel 14 which extends the chamber of the screw 8. The part 11 is also pierced with two channels 15 and 16 respectively. The channel 15 causes the chamber of the screw 8' to communicate with a coupling socket 17 joining the part 11 to a plate indicated at 18 and which is fixed on the fixed plate 2, while the channel 16 causes the channel 14 of the member 13 to communicate with a second socket 19 for coupling the member 11 to the plate 18. In the set of plates 18 are arranged identical distributor valves with two passages, indicated generally at 23 and which have a structure similar to that of the valve described in French Pat. No. 1,290,262.

In the example shown, each of these distributor valves is constituted by a hollow housing 24 having opposite conical seatings 25 and 26 and in which is mounted in an axially-movable manner a member 27 playing the part of a valve.

The valve 27 has conical extremities 28—29 corresponding to the seatings 25, 26, and a wide head 30 of the same section as the housing is in sliding contact with the wall of this latter, the head being extended by a portion 31 of smaller section.

The extremities of the housings 24 forming the seating 25 are connected to each other by a system of channels 32 connected in turn to the channel 33 of the socket 17. On the other hand, the opposite extremities 26 of the housings are respectively extended by a discharge channel 34—35 opening into the fixed face of the mould facing opposite the moving mould which has a hollow impression E of the member to be moulded.

In addition, a second system of channels 36 communicating with the channel 37 of the socket 19 is also connected to each of the housings 24 in a zone located between the seatings 25-26 and forming a chamber between the inner wall of the housings and the reduced portion of the valve.

Finally, each valve 27 is pierced with an internal bore 38 opening at the two conical extremities 28-29. The valves being axially movable in their housings, it will be understood that when a material is injected into the channels 32 coming from the supply system 6, the pressure of the material pushes the valve against its seating 26 which permits it to flow into the channels 38 and 34 (position shown in FIG. 2).

On the other hand, as soon as the injection of material into the channel 32 is stopped and another material is injected into the channel 36, the pressure of the material pushes the valve back against its seating 25, which permits material to flow into the chamber surrounding the narrow portion 31 of the valve, and then into the channel 34.

Since with these arrangements the materials must flow through a fairly-long system of channels before being injected into the mould, in order to keep the materials at a suitable degree of viscosity, the said channels 32 and 36 are heated and for that purpose a heating system is provided in the plate 18, either electric or by circulation of a hot fluid.

It will be seen from FIG. 1 that on the channels 14 and 15 which extend the screws 8 and 8', there are advantageously interposed spigot cocks 39–40, the operation of which is controlled by a transmission 41–42 in dependence on the operation of the screw with which they are associated. In other words, at the beginning of the movement of the screw for injection, the cock is automatically opened (position of the cock 39 of FIG. 1) whereas it is closed at the end of the injection and as long as the screw is not actuated (position of the cock 40).

The arrangement shown in FIG. 2 permits the manufacture of the articles having a homogeneous core $c$ of a given material (in the form of foam or otherwise) coated with a skin $p$ continuously formed from a second material (see FIGS. 2 and 3). In order to permit of good homogeneity of the core $c$, there is provided in the mould, at least at the level of the junction plane of the two materials, a notch 43 extending substantially perpendicular to the joint plane $X_tX$ of the mould and permitting a leakage of a pre-determined quantity of the material forming the skin out of the mould space.

The function of these notches 43 will be better understood by examining FIGS. 3b to 3d which show the course of the process of formation of a panel by means of two distributor valves, the discharge channels of which into the mould M have been simply indicated at $N_1$ and $N_2$.

According to this method, two charges $P_1$ and $P_2$ of a first material intended to form the skin are first injected through the channels $N_1$ and $N_2$. Subsequently, there is injected into the interior of each of the charges $P_1$ and $P_2$ a charge $Q_1$ and $Q_2$ of a second material, for example an expandable foam. As they expand, the charges $Q_1$ and $Q_2$ push back the first material in the direction of the arrows against the walls of the mould. In the central zone of the mould, the skins $P_1$ and $P_2$ come into contact as indicated in broken lines in FIG. 3c.

It will be understood that in the absence of any possibility of leakage of the skins out of the mould chamber, these latter become welded together and prevent the materials $Q_1$ and $Q_2$ from coming into contact with each other. There would thus remain in the final panel a line of first material embedded in the second material.

On the contrary, as shown in FIG. 3d, by virtue of the notches 43 provided in accordance with the invention, the materials $Q_1$ and $Q_2$ apply a continuous thrust on the skins and push them back into the notches 43, thus permitting the formation of a continuous core.

It will be noted that it would also be possible, if this proved necessary, to provide notches in the plane of the mould in the corners of the space intended to receive the material, like those which are indicated at 44 in FIG. 3a. These notches 44 permit a leakage of the material constituting the skin into the angles of the moulded piece, which avoids the formation of over-thicknesses of skin in these zones. When once removed from the mould, the piece (shown in section in FIG. 3a) has, at least in its central portion, one or more deadheads 45 generally shaped like a mushroom, which can be broken-off level with the wall of the piece, along the line X'—X' for example.

The piece may also have identical deadheads 45' in its angles, and these deadheads can subsequently be broken-off so as to obtain an article with a uniform external wall.

There will now be described with reference to FIG. 4 a form of construction of a press according to the invention, designed so as to produce complex pieces. The example shown should naturally not be considered as restrictive.

The major part of the installation of FIG. 4 is identical with that of FIG. 2, and similar members have been indicated by the same reference numbers.

The essential difference resides in the constitution of the assembly of distributor valves mounted in the fixed plate of the mould, and also in the shape of the mould, this installation being intended to mould an article having a portion 50 composed of a single material, and a portion 51 formed by a core 52 of a given material surrounded by a skin 53 made from a different material, which may be in the example shown, the same as that which constitutes the portion 50.

Two different distribution valves are therefore mounted in the fixed mould in the example shown, one 54 being single way and the other 55 with two ways. The valve 54 is fixed in its housing and its internal channel 56 is in constant communication with the system of channels 57 coupled to one of the plastification screws.

The system of channels 57 also supplies the internal channel 58 of the two-way valve 55, which is of identically the same construction as those of FIG. 2, and is therefore movable axially in its housing. On the other hand, the channel 58' communicating with the second screw 5 is connected only to the external chamber 59 of the valve 55.

The moving body of the valve 55 is coupled by a rod 60 which extends it to a piston 61 of a valve-operating system. The piston 61 slides in a cylinder 62 supplied with hydraulic or pneumatic fluid. This operating system, which is not restrictive, may be of another type, for example mechanical or electrical, and it makes it possible to select the position of the valve in dependence on the material to be injected.

It would of course be possible to have available several valves 54 and several valves 55, depending on the article to be produced.

In the example of construction which has just been described, the case has been provided for in which the multi-way valves made possible a selective injection of the materials, that is to say the passage of only one material at a time.

However, it will be understood that for certain applications it could be desired to effect simultaneous injection of two or more material through the same valve. In this case, the selective passage valves described above could be replaced by valves permitting simultaneous passage of the materials. A valve of this type is also described in French Pat. No. 1,290,262.

I claim:

1. An injection-molding machine for molding articles having at least locally, composite portions in which are found at least two materials of different compositions, one of which is coated by the other, said machine comprising:

a frame, a mold supported on said frame including a fixed part and a movable part and having opposed surfaces at least one of which is movable toward and away from the other surface, said surfaces defining a joint plane for a mold cavity between said fixed and movable parts when the mold is closed, said mold including at least a pair of inlets to said mold cavity for delivering mold materials into said cavity with at least one of the fixed and movable parts of the mold having means providing for leakage of material outwards of said mold cavity in a plane substantially perpendicular to the joint plane, at least two separate supply systems supported on said frame for injecting materials through said inlets into said mold cavity, and a plurality of distributor means for the materials in communication with said mold cavity through said inlets, at least two of said distributor means each including a member movable for selectively and alternately connecting one or another of said separate supply systems with said mold cavity through a corresponding inlet to cause successive injection into the mold cavity of at least two materials of different compositions respectively, said inlets being spaced one from the other such that the successive injection of the two different materials through each inlet is provided at different locations within said cavity thereby initially forming a pair of discrete composite segments of said materials therein with one material forming a coating for a core formed of the other material in each segment, said leakage means being located between said inets and providing for flow of coating material outwardly of said mold cavity to enable the core material of each composite segment to unite one with the other upon formation of the final composite article.

2. A machine as claimed in claim 1 wherein said leakage means comprises a recess formed in at least one of the fixed or movable parts of the mold and in communication with said mold cavity.

3. An injection-molding machine for molding articles having at least locally, composite portions in which are found at least two materials of different compositions, one of which is coated by the other, said machine comprising:

a frame, a mold supported on said frame including a fixed part and a movable part and having opposed surfaces at least one of which is movable toward and away from the other surface, said surfaces defining a joint plane for a mold cavity between said fixed and movable parts when the mold is closed and including a depressed portion formed in at least one of said surfaces comprised of a hollow impression of the article to be molded, said mold including a least a pair of inlets to said mold cavity for delivering mold materials into said mold cavity, at least a recess being provided in and substantially perpendicularly to said depressed surface providing for leakage of material outwards of said mold cavity and away from said joint plane, at least two separate supply systems supported on said frame for injecting materials through said inlets into said mold cavity, and a plurality of distributor means for the materials in communication with said mold cavity through said inlets, at least two of said distributor means each including a member movable for selectively and alternately connecting one or another of said separate supply systems with said mold cavity through a corresponding inlet to cause successive injection into the mold cavity of at least two materials of different compositions respectively, said inlets being spaced one from the other such that the successive injection of the two different materials through each inlet is provided at different locations within said cavity thereby initially forming a pair of discrete composite segments of said materials therein with one material forming a coating for a core formed of the other material in each segment, said recess being located between said inlets and providing for flow of coating material outwardly of said mold cavity to enable the core material of each composite segment to unite one with the other upon formation of the final composite article.

4. A machine according to claim 3 wherein said recess is provided in a plane parallel to and extending between said distributor means.

5. An injection-molding machine for molding articles having at least locally, composite portions in which are found at least two materials of different compositions, one of which is coated by the other, said machine comprising:

a frame, a mold supported on said frame including a fixed part and a movable part having opposed surfaces at least one of which is movable toward and away from the other surface, said surfaces defining a joint plane for a mold cavity between said fixed and movable parts when the mold is closed, said mold including at least a pair of inlets to said mold cavity for delivering mold materials into said cavity, said mold cavity being delimited by the surface of one part of the mold and by a depressed portion of the surface of the other part of the mold, the surface of said one mold part having a recess extending substantially perpendicularly to said surface providing for leakage of material outwards of said mold cavity and away from the joint plane, at least two separate supply systems supported on said frame for injecting materials through said inlets into said mold cavity, and a plurality of distributor means for the materials in communication with said mold cavity through said inlets, at least two of said distributor means each including a member movable for selectively and alternately connecting one or another of said separate supply systems with said mold cavity through a corresponding inlet to cause successive injection into the mold of at least two materials of different compositions respectively, said inlets being spaced one from the other such that the successive injection of the two different materials through each inlet is provided at different locations within said cavity thereby initially forming a pair of discrete composite segments of said materials therein with one material forming a coating for a core formed of the other material in each segment, said recess being located between said inlets and providing for flow of the coating material outwardly of said mold cavity to enable the core material of each composite segment to unite one with the other upon formation of the final composite article.

6. A machine as claimed in claim 5 wherein said plurality of distributor means is provided in the fixed part of the mold, said recess being provided in the surface of the fixed part of the mold.

7. An injection-molding machine for molding articles having at least locally, composite portions in which are found at least two materials of different compositions, one of which is coated by the other, said machine comprising:

a frame, a mold supported on said frame including a fixed part and a movable part and having opposed surfaces at least one of which is movable toward and away from the other surface, said surfaces defining a joint plane for a mold cavity between said fixed and movable parts when the mold is closed and including a depressed portion formed in at least one of said surfaces comprised of a hollow impression of the article to be molded, said mold including at least a pair of inlets to said mold cavity for delivering mold materials into said cavity, a recess formed in the mold surface of each of said fixed and movable parts, said recesses being in at least a plane substantially perpendicular to said joint plane of said mold providing for leakage of material outwards of said mold cavity and away from the joint plane, at least two separate supply systems supported on said frame for injecting materials through said inlets into said mold cavity, and a plurality of distributor means for the materials in communication with said mold cavity through said inlets, at least two of said distributor means each including a member movable for selectively and alternately connecting on or another of said separate supply systems with said mold cavity through a corresponding inlet to cause successive injection into the mold cavity of at least two materials of different compositions respectively, said inlets being spaced one from the other such that the successive injection of the two different materials through each inlet is provided at different locations within said cavity thereby initially forming a pair of discrete composite segments of said materials therein with one material forming a coating for a core formed of the other material in each segment, said recess being located between said inlets and providing for flow of the coating material outwardly of said mold cavity to enable the core material of each composite segment to unite one with the other upon formation of the final composite article.

8. A machine according to claim 7 wherein said recesses are provided in a plane parallel to and extending between said two distributor means.

9. A machine according to claim 7 wherein said recesses comprise a slot surrounding said cavity mold.

10. An injection-molding machine for molding articles having at least locally, composite portions in which are found at least two materials of different compositions, one of which is coated by the other, said machine comprising:
  a frame,
  a mold supported on said frame including a fixed part and a movable part and having opposed surfaces at least one of which is movable toward and away from the other surface, said surfaces defining a joint plane for a mold cavity between said fixed and movable parts when the mold is closed, said mold including at least a pair of inlets to said mold cavity for delivering mold materials into said cavity with at least one of the fixed and movable parts of the mold having means providing for leakage of material outwards of said mold cavity in a plane substantially perpendicular to the joint plane,
  at least two separate supply systems supported on said frame for injecting materials through said inlets into said mold cavity, and
  at least two multi-way valves mounted between said supply systems and said cavity in the mold, each of said valves communicating with said mold cavity through a corresponding inlet and being movable for selectively and alternately connecting one or another of said separate supply systems with said mold cavity through said corresponding inlet to cause successive injection into the mold cavity of at least two materials of different compositions respectively, said inlets being spaced one from the other such that the successive injection of the two different materials through each inlet is provided at different locations within said cavity thereby initially forming a pair of discrete composite segments of said materials therein with one material forming a coating for a core formed of the other material in each segment, said leakage means being located between said inlets and providing for flow of the coating material outwardly of said mold cavity to enable the core material of each composite segment to unite one with the other upon formation of the final composite article.

* * * * *

UNITED STATES PATENT AND TRADEMARK OFFICE
CERTIFICATE OF CORRECTION

PATENT NO. : 4,029,454
DATED : June 14, 1977
INVENTOR(S) : Bernard Leon Monnet

It is certified that error appears in the above-identified patent and that said Letters Patent are hereby corrected as shown below:

Column 6, Claim 1, line 64, "inets" should be --inlets--.

Column 8, Claim 7, line 64, "on" should be --one--; and

Column 9, Claim 7, line 8, "recess" should be --recesses--.

Signed and Sealed this

Twentieth Day of September 1977

[SEAL]

Attest:

RUTH C. MASON
Attesting Officer

LUTRELLE F. PARKER
Acting Commissioner of Patents and Trademarks